(12) United States Patent
Katsura

(10) Patent No.: US 8,272,656 B2
(45) Date of Patent: Sep. 25, 2012

(54) FRAME STRUCTURE OF A VEHICLE

(75) Inventor: Takehisa Katsura, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 195 days.

(21) Appl. No.: 12/656,488

(22) Filed: Feb. 1, 2010

(65) Prior Publication Data
US 2010/0194072 A1 Aug. 5, 2010

(30) Foreign Application Priority Data

Feb. 2, 2009 (JP) ................................ 2009-021322

(51) Int. Cl.
*B62K 19/00* (2006.01)
(52) U.S. Cl. ...................... 280/279; 280/274; 280/281.1
(58) Field of Classification Search .................. 280/279, 280/274, 281.1
See application file for complete search history.

(56) References Cited

U.S. PATENT DOCUMENTS

| | | | |
|---|---|---|---|
| 5,353,888 A * | 10/1994 | Tsukahara | 180/219 |
| 6,481,522 B1 | 11/2002 | Adachi | |
| 7,503,575 B2 * | 3/2009 | Kurokawa et al. | 280/279 |
| 7,694,985 B2 * | 4/2010 | Hoshi | 280/274 |
| 2006/0157955 A1 * | 7/2006 | Kurokawa et al. | 280/279 |
| 2006/0273542 A1 * | 12/2006 | Chamberlain | 280/274 |

FOREIGN PATENT DOCUMENTS

JP 60-022580 A 2/1985

* cited by examiner

*Primary Examiner* — Tashiana Adams
*Assistant Examiner* — Marlon Arce
(74) *Attorney, Agent, or Firm* — Rabin & Berdo, P.C.

(57) ABSTRACT

A vehicle, such as a motorcycle, has a structure in which strength of a body frame is increased and positional accuracy between members constituting the body frame is improved. A head pipe of the motorcycle can include a pipe portion inside which a steering shaft is disposed, and a wall portion formed rearward of the pipe portion. The wall portion and the pipe portion can be integrally formed by extruding performed in a direction in which the pipe portion extends. Left and right main frames extending rearward can be disposed on the wall portion. The motorcycle can further include a reinforcing member disposed rearward of the wall portion, arranged such that an upper portion thereof is sandwiched by the right and left main frames, and having rest portions on which the right and left main frames are placed.

7 Claims, 10 Drawing Sheets

FRAME STRUCTURE OF A VEHICLE

CROSS-REFERENCE TO RELATED APPLICATION

This application claims priority under 35 U.S.C. §119 from Japanese Patent Application JP 2009-021322 filed on Feb. 2, 2009, the entirety of which is incorporated herein by reference.

BACKGROUND OF THE INVENTION

1. Field of the Invention

Embodiments of the present invention relate to a frame structure of a vehicle, such as a motorcycle.

2. Description of the Related Art

Conventionally, a body frame of a motorcycle including a head pipe supporting a steering shaft, and right and left main frames arranged extending rearward from the head pipe is available. A head pipe disclosed in Japanese Patent No. 4132431 includes a wall portion formed to extend rearward between right and left main frames. The wall portion has flange portions formed thereon, the flange portions projecting in a right-to-left direction to support the main frames from below. The wall portion also has flange portions formed thereon, the flange portions projecting in the right-to-left direction to define an interval between the right and left main frames. With this structure, frame strength is improved.

The head pipe disclosed in Japanese Patent No. 4132431 is formed integrally by forging, a process in which pressure is applied to a material from right and left sides of the material. Specifically, the pressure is first applied to the material from the right and left sides thereof to form a forged member having a columnar portion. After that, a hole for inserting the steering shaft is formed in the columnar portion by cutting work. By handling the forged member in this way, strength of the body frame is improved.

SUMMARY OF THE INVENTION

Embodiments of the present invention provide a vehicle, such as a motorcycle, in which strength of the body frame is increased and positional accuracy between members of the body frame is improved.

A vehicle, such as a motorcycle, according to embodiments of the invention can include a head pipe and left and right main frames connected to the head pipe. The head pipe can include a pipe portion in which a steering shaft is inserted, and a wall portion formed behind the pipe portion. The wall portion and the pipe portion can be integrally formed by extruding performed in a direction in which the pipe portion extends. The main frames can be arranged to extend rearward from the pipe portion, and be disposed on the wall portion. The vehicle can further include a reinforcing member disposed behind the wall portion and in contact with a rear edge of the wall portion. The reinforcing member can be arranged such that an upper portion of the reinforcing member is sandwiched by the right and left main frames. The reinforcing member can include rest portions formed on a right side surface and a left side surface thereof, and the right and left main frames can be respectively disposed on the rest portions.

A vehicle, such as a motorcycle, as described in the foregoing has a number of advantageous properties. For example, because the head pipe can be formed by extruding, it is possible to increase strength of the head pipe. Further, because the wall portion of the head pipe on which the main frames are disposed can be integrally formed with the pipe portion, it is possible to improve relative positional accuracy between the main frames and the head pipe. In addition, because the reinforcing member can be arranged to be in contact with the rear edge of the wall portion, it is possible to prevent the head pipe and the reinforcing member from being displaced from relative positions thereof. Moreover, because the main frames can be disposed on the rest portions formed on the side surfaces of the reinforcing member, it is possible to prevent the right and left mainframes from being relatively displaced with respect to the reinforcing member.

Other features, elements, steps, characteristics and advantages of the invention will become more apparent from the following detailed description of embodiments of the invention with reference to the attached drawings.

DETAILED DESCRIPTION OF THE INVENTION

Figure 1:
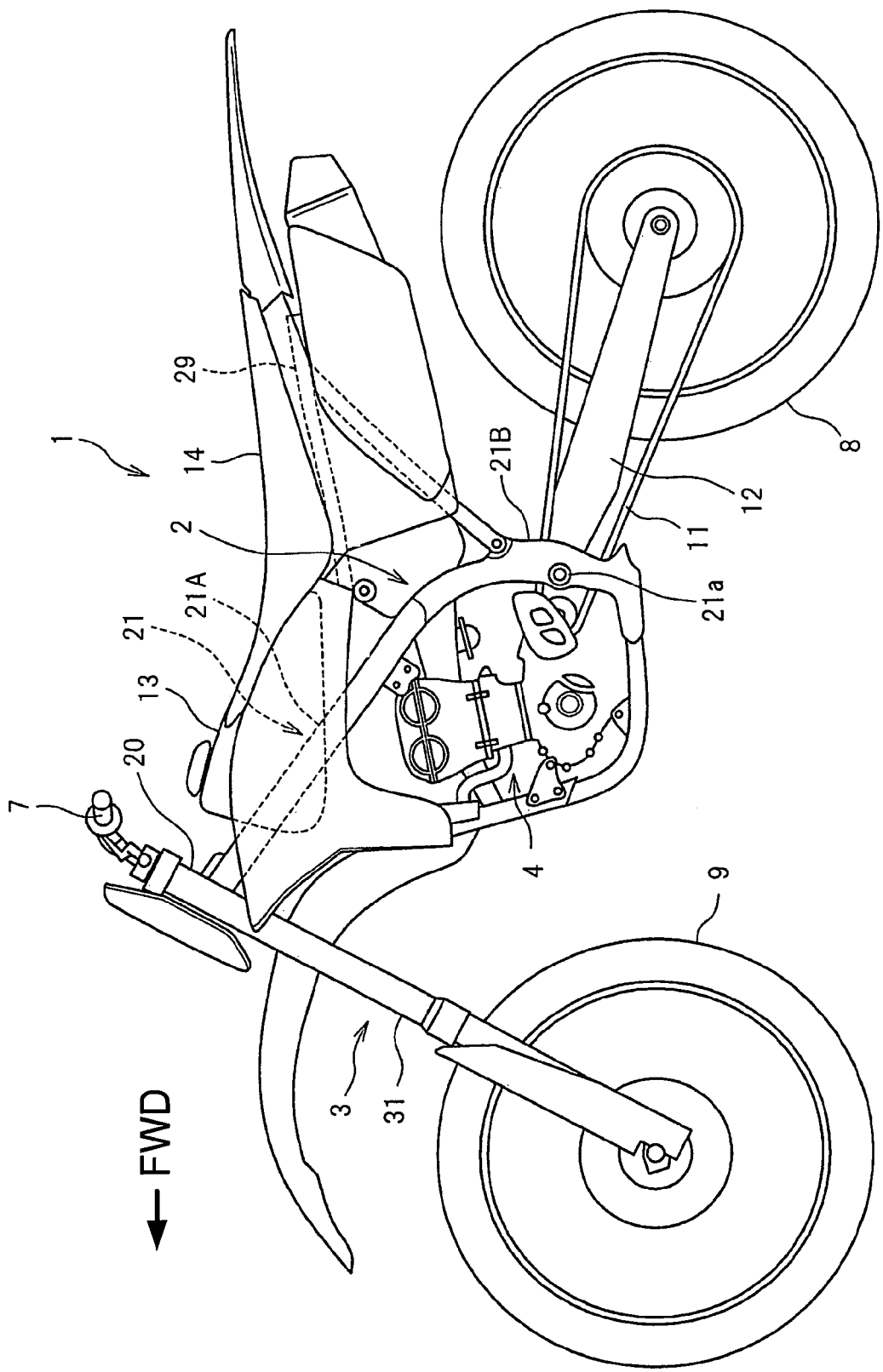
FIG. 1 is a side view of a motorcycle according to an exemplary embodiment of the invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "frontward," "ahead," "back," "rear," "rearward," "behind," "right," "left," "above," "below," "up," "upward," "down," "downward," "forward,"

"backward," "outward" and "body width direction." As used herein, these terms reflect the perspective of a person facing in the direction indicated by the arrow labeled "FWD" in the drawings, such as a rider seated on or straddling the motorcycle 1 and facing toward the front wheel 9. Thus, the arrow labeled "FWD" indicates a back-to-front direction relative to the motorcycle 1, or an advancing direction of the motorcycle 1. A direction specified as "left" or "right" in the description refers to left or right with respect to the FWD direction or a direction opposite to (e.g. 180 degrees from) the FWD direction. "Body width direction" corresponds to a direction substantially transverse to the FWD direction or to a direction opposite to the FWD direction, e.g., a left-to-right or right-to-left direction. "Lengthwise" (with respect to the motorcycle 1) corresponds substantially to the FWD direction or to a direction opposite to the FWD direction.

Figure 2:
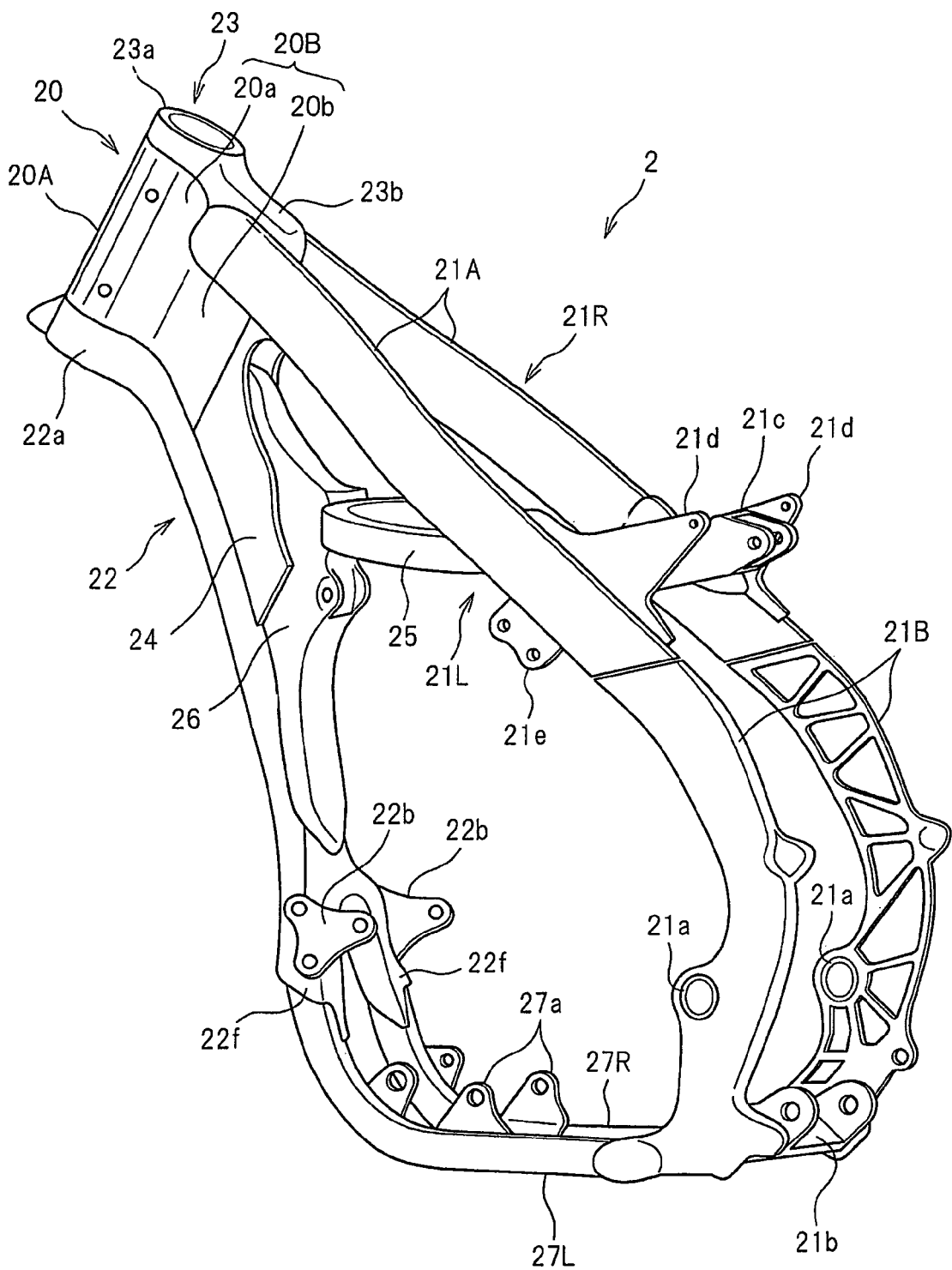
FIG. 2 is a perspective view of a body frame of the motorcycle.

As illustrated in FIGS. 1 and 2, a motorcycle 1 according to an exemplary embodiment can include a body frame 2, a front suspension 3, and an engine 4. The body frame 2 can include a head pipe 20 located at a front end of the body frame 2, and a main frame portion 21 comprising right and left main frame portions 21R and 21L, arranged to extend diagonally rearward and downward from the head pipe 20. The motorcycle 1 can be, for example, a so-called "off-road-type" motorcycle for running on rugged terrain or the like.

A front suspension 3 can include right and left shock absorbers 31 extending obliquely in an approximately or substantially up-and-down direction. Lower ends of the shock absorbers 31 can support a front wheel 9. A bracket 32 holding the shock absorbers 31 can bridge upper portions of the right and left shock absorbers 31 (see FIG. 4). Further, a steering shaft 5 can be arranged between the upper portions of the right and left shock absorbers 31. The steering shaft 5 can be disposed, e.g., inserted, inside the head pipe 20 (see FIG. 8) and supported rotatably. A handlebar 7 disposed above the steering shaft 5 can be fixed to the bracket 32 provided on the front suspension 3. Further, the front wheel 9, the front suspension 3, and the handlebar 7 can be configured to turn leftward and rightward together with each other around the steering shaft 5.

The right and left main frame portions 21R and 21L can include right and left front pipe portions 21A in respective front portions thereof (see FIG. 2). The engine 4 can be disposed below the front pipe portions 21A and suspended by the front pipe portions 21A. A rear wheel 8 can be disposed behind the engine 4. Torque output from the engine 4 can be transmitted to the rear wheel 8 via a chain 11. Further, a rear arm 12 can be located rearward of the engine 4 and arranged to extend in a front-to-rear direction. An axle of the rear wheel 8 can be supported by a rear end of the rear arm 12. As illustrated in FIG. 2, the right and left main frame portions 21R and 21L can include rear frame portions 21B in respective rear portions thereof. The rear frame portions 21B can each include pivot support portions 21a at positions rearward of the engine 4. A front end of the rear arm 12 can be supported by a pivot (not shown) supported by the pivot support portions 21a, and the rear arm 12 and the rear wheel 8 can swing upward and downward around the pivot.

As illustrated in FIG. 1, a fuel tank 13 can be disposed above the engine 4. The fuel tank 13 can be located between and supported by the front pipe portions 21A. A seat 14 allowing a rider to sit astride the motorcycle 1 can be disposed rearward of the fuel tank 13. A rear frame 29 can be disposed under the seat 14, and a front end of the rear frame 29 can be connected to the front pipe portions 21A. The seat 14 can be supported by the rear frame 29.

Figure 3:
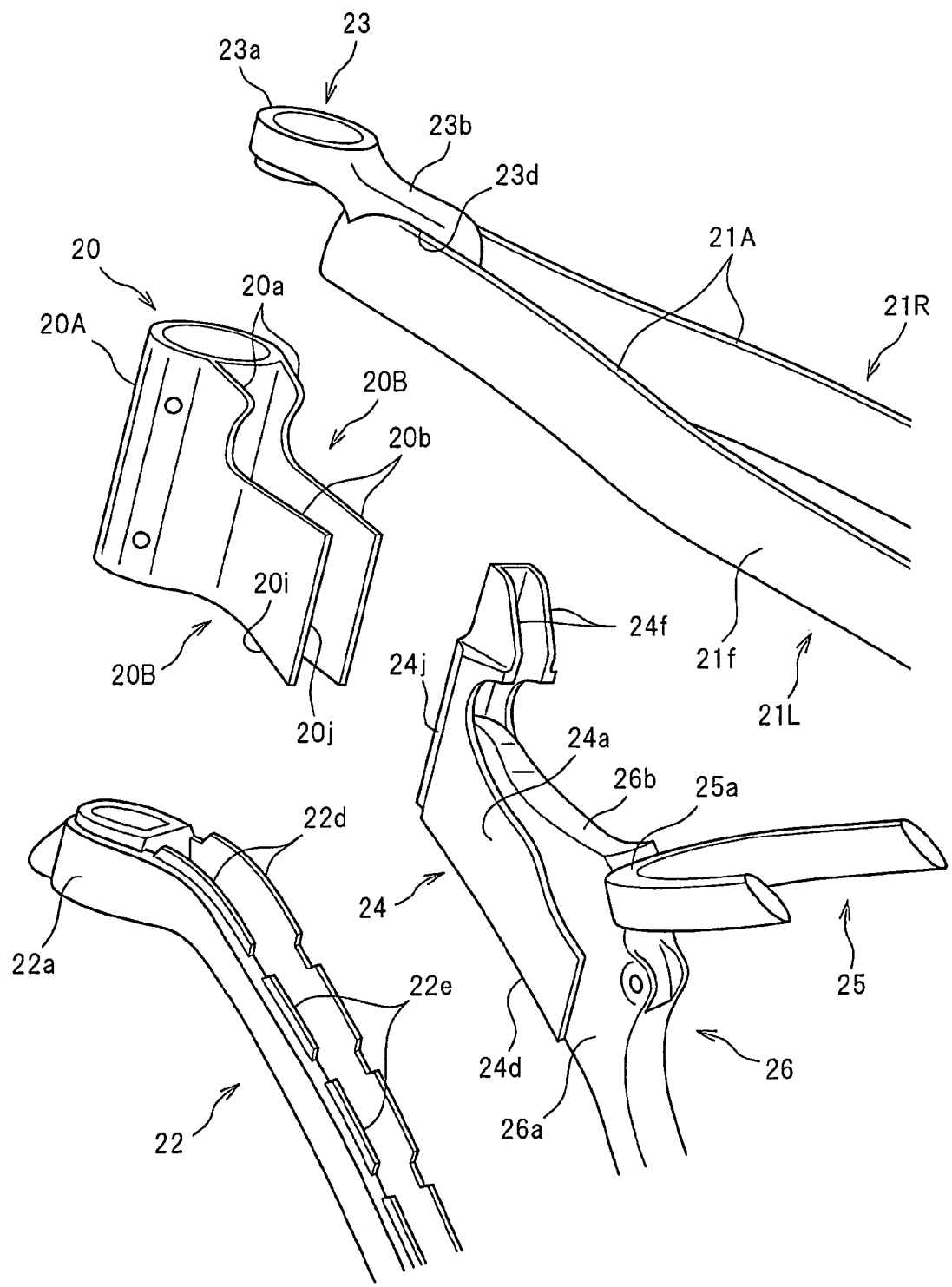
FIG. 3 is an exploded perspective view of a front portion of the body frame.

The following describes a body frame 2 of the motorcycle 1 in more detail. As illustrated in FIGS. 2 and 3, besides the head pipe 20 and the main frame portions 21R and 21L described in the foregoing, the body frame 2 can include a down frame portion 22, a bearing retaining member 23, and right and left lower frame portions 27R and 27L.

Front ends of the main frame portions 21R and 21L, or more particularly, front ends of the right and left front pipe portions 21A, can be connected or fastened, e.g., welded, to the head pipe 20. Each of the front pipe portions 21A can be arranged to extend from the head pipe 20 diagonally rearward and downward. The head pipe 20 can include a tubular pipe portion 20A, and the steering shaft 5 can be disposed, e.g., inserted, inside the pipe portion 20A. Each of the front pipe portions 21A can be arranged to extend rearward from the pipe portion 20A.

As illustrated in FIG. 2, the right and left front pipe portions 21A can be arranged such that an interval or space between them increases toward the rear. A cross portion 21c can bridge rear ends of the front pipe portions 21A. Further, brackets 21d, protruding obliquely upward from the rear ends of the front pipe portions 21A, can be respectively fixed to the rear ends of the front pipe portions 21A. The front end of the rear frame 29 can be fixed to the brackets 21d. In addition, a bracket 21e protruding obliquely downward from at least one of the rear ends (e.g., the left one) of the front pipe portions 21A can be fixed to the at least one of the rear ends of the front pipe portions 21A. An upper portion of the engine 4 can be fixed to the bracket 21e. The rear frame portions 21B can be disposed rearward of the engine 4, extending from the front pipe portions 21A downward. A cross portion 21b can bridge lower ends of the rear frame portions 21B. The front pipe portions 21A and the rear frame portions 21B can be separately-formed members, and upper ends of the rear frame portions 21B can be connected or fastened, e.g., welded, to the rear ends of the front pipe portions 21A.

As illustrated in FIG. 3, the bearing retaining member 23 can be connected or fastened, e.g., welded, to upper surfaces of the front ends of the front pipe portions 21A. The bearing retaining member 23 can retain a bearing 51 which rotatably supports the steering shaft 5 (see FIG. 8), and hence can include an annular bearing retaining portion 23a in which the bearing 51 is disposed, e.g., press-fitted. Further, the bearing retaining member 23 can include a rear welded portion 23b, formed to extend rearward from the bearing retaining portion 23a, and connected or fastened, e.g., welded, to the upper surfaces of the front pipe portions 21A. For example, the rear welded portion 23b can be located between the front portions of the right and left front pipe portions 21A, and right and left edges 23d of the rear welded portion 23b can be respectively connected or fastened, e.g., welded, onto outer peripheral surfaces of the front pipe portions 21A.

Figure 8:
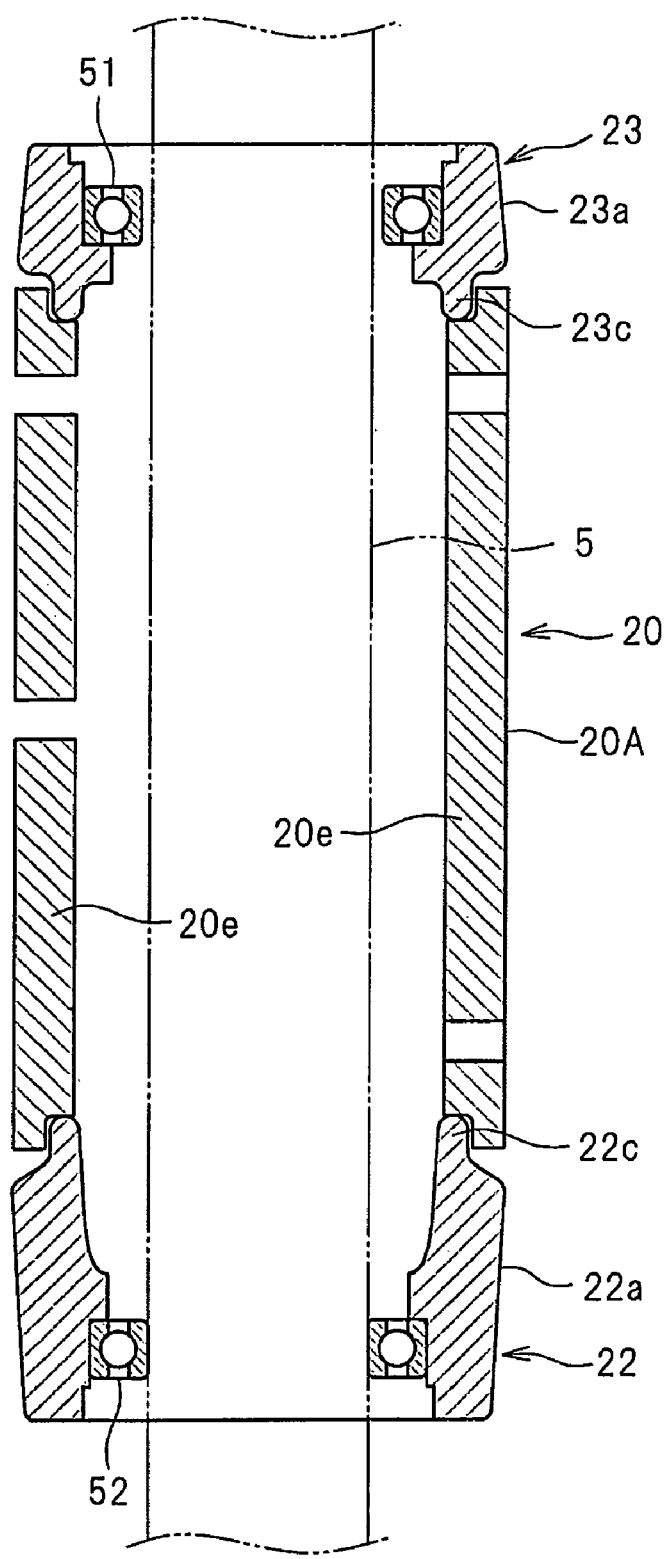
FIG. 8 is a sectional view taken along the line VIII-VIII of FIG. 4.

As illustrated in FIG. 3, the down frame portion 22 can be arranged to extend from the lower end of the head pipe 20 diagonally rearward and downward. The down frame portion 22 can include a bearing retaining portion 22a at a front end thereof. As illustrated in FIG. 8, the bearing retaining portion 22a can be formed into an annular shape, and a bearing 52 rotatably supporting the steering shaft 5 can be disposed in, e.g., press-fitted into, the bearing retaining portion 22a. The bearing retaining portion 22a can be connected or fastened, e.g., welded, to a lower edge of the pipe portion 20A of the head pipe 20. The down frame portion 22 can be formed to extend from the bearing retaining portion 22a diagonally rearward and downward.

As illustrated in FIG. 2, a rear portion of the down frame portion 22 can extend to as to have a forked shape. In other words, the down frame portion 22 can include right and left extending portions 22f in the rear portion thereof. A bracket 22b protruding rearward can be fixed to each of the extending portions 22f. A front portion of the engine 4 can be fixed to the brackets 22b. With this structure, the down frame portion 22 can support the engine 4.

The right and left lower frame portions 27R and 27L can extend downward from the right and left extending portions 22f and 22f for a predetermined extent, and then bend rearward, to extend rearward below the engine 4. Rear ends of the lower frame portions 27R and 27L can be connected or fastened, e.g., welded, to respective lower ends of the rear frame portions 21B. A bracket 27a protruding upward can be provided to each of the right and left lower frame portions 27R and 27L. The brackets 27a can be fixed to the engine 4. With this structure, the lower frame portions 27R and 27L can support the engine 4 from below.

Figure 9:
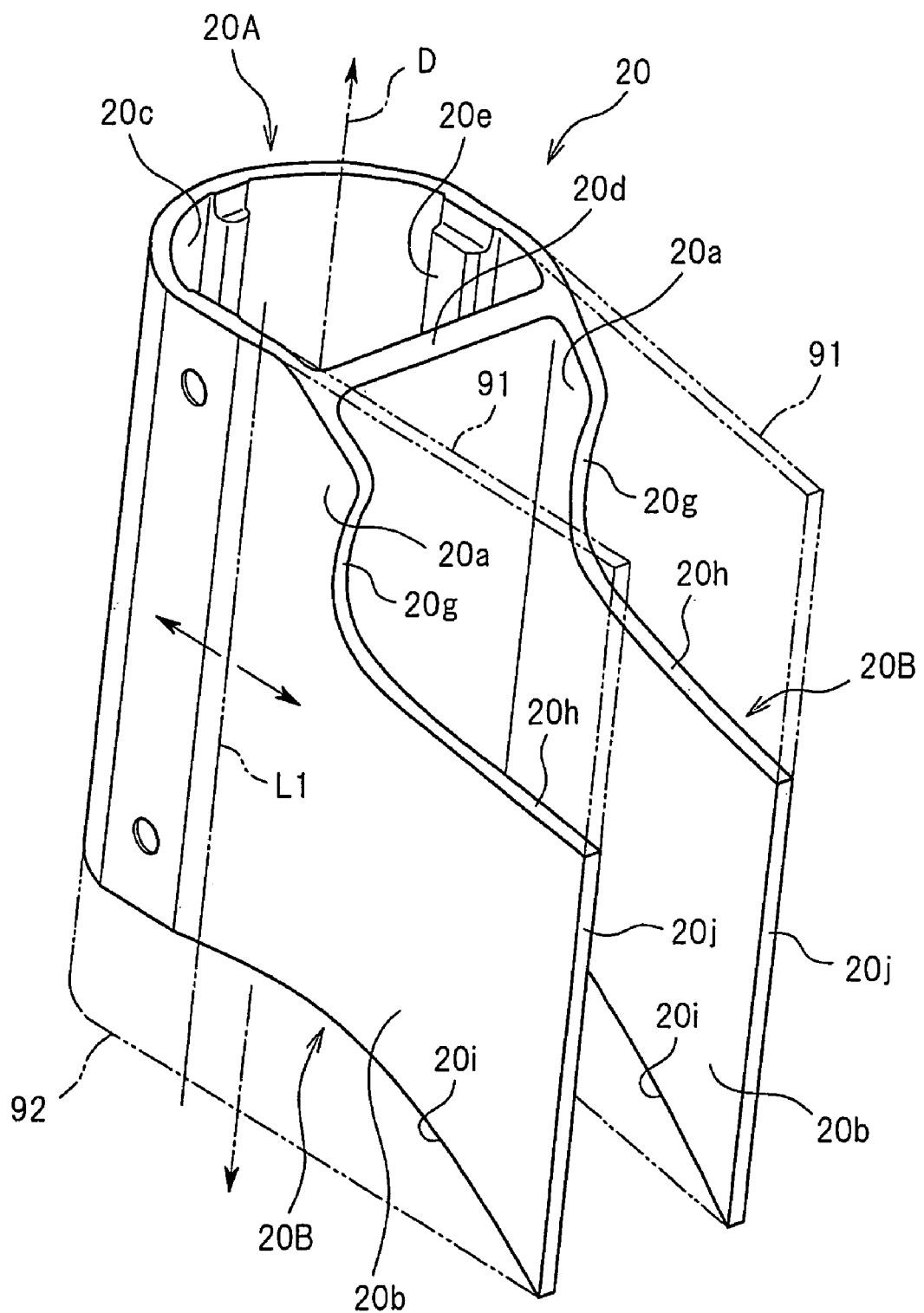
FIG. 9 is a perspective view of the head pipe.

As described previously, the head pipe 20 can include the pipe portion 20A inside which the steering shaft 5 is disposed. Further, as illustrated in FIGS. 3 and 9, the head pipe 20 can include right and left wall portions 20B, formed into wall shapes extending rearward from the pipe portion 20A, and spaced apart from each other in a right-to-left direction. Each of the wall portions 20B can include a side wall portion 20a and a lower wall portion 20b. The side wall portions 20a can be connected or fastened, e.g., welded, onto side surfaces 21f of the front pipe portions 21A of the main frame portions 21R and 21L. The lower wall portions 20b can be located below the front pipe portions 21A, and be connected or fastened, e.g., welded, to lower edges of the front pipe portions 21A. The pipe portion 20A, the side wall portions 20a, and the lower wall portions 20b can be formed integrally with each other, e.g., as a single unitary part or member.

Figure 5:
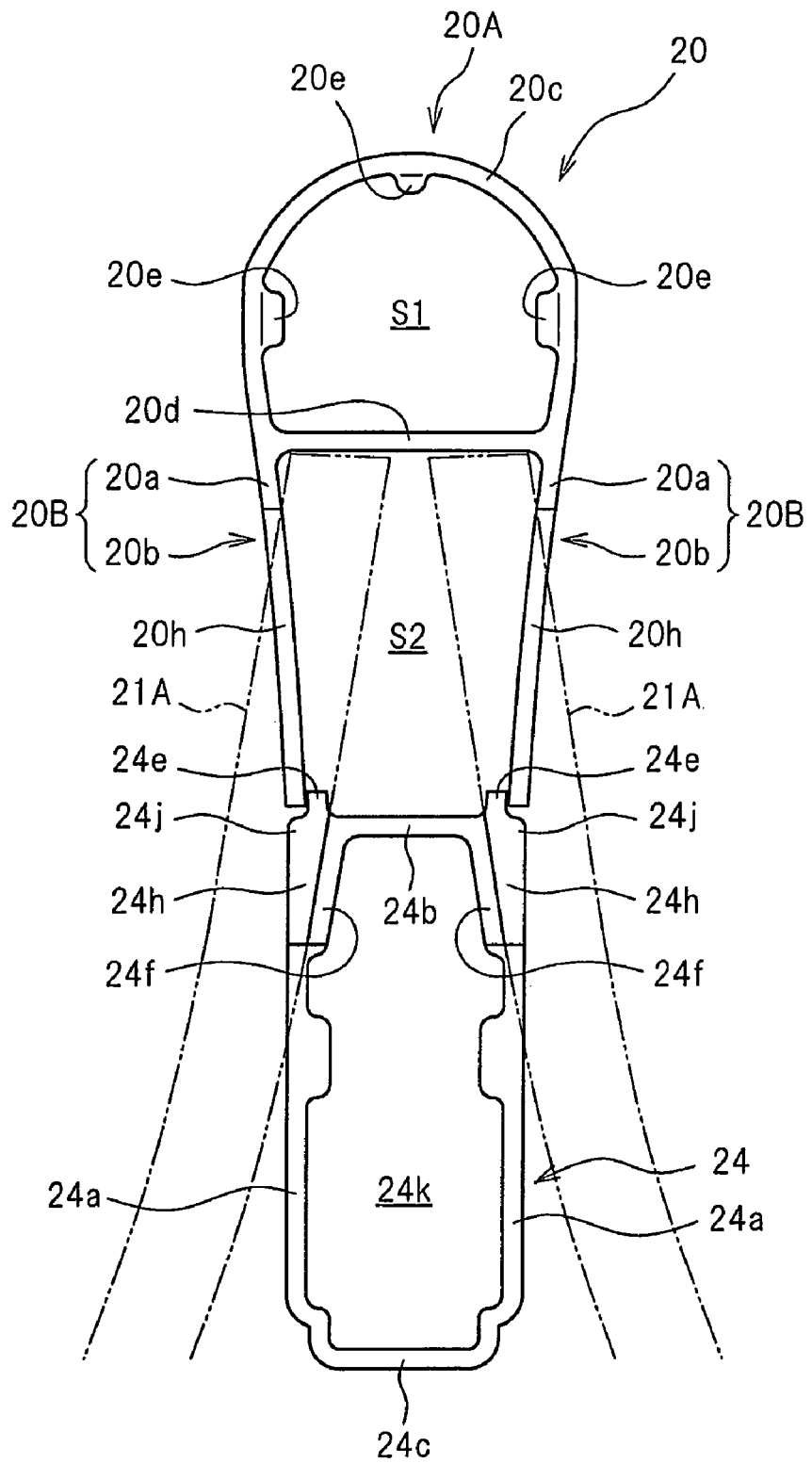
FIG. 5 is a plan view of a head pipe and a reinforcing member provided at a front end of the body frame.
Figure 6:
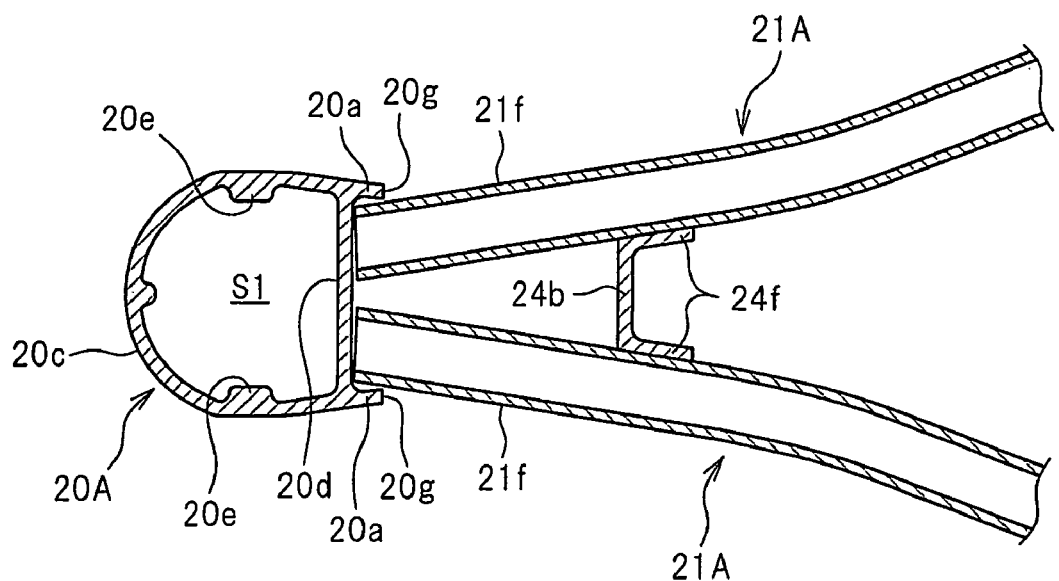
FIG. 6 is a sectional view taken along the line VI-VI of FIG. 4.
Figure 7:
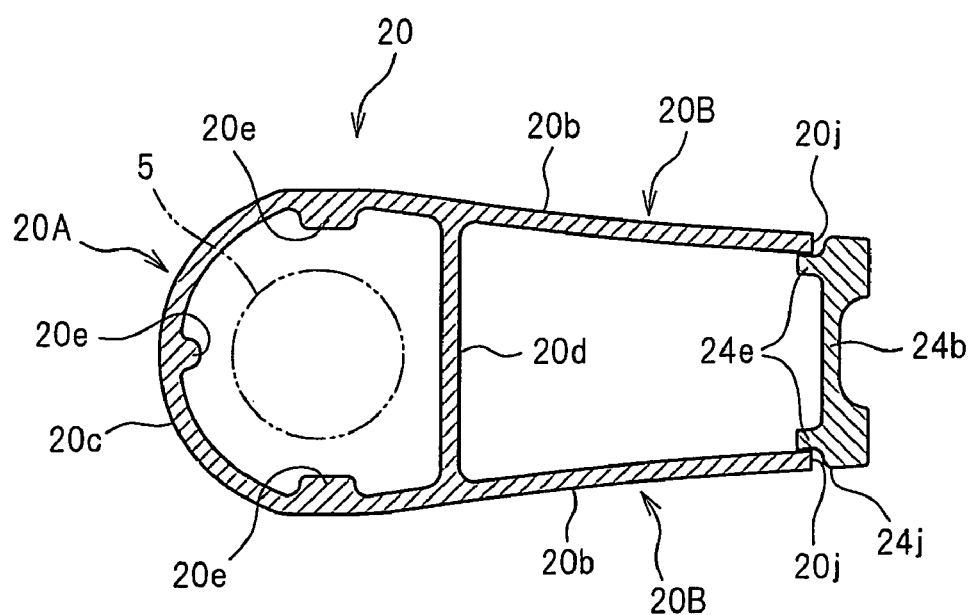
FIG. 7 is a sectional view taken along the line VII-VII of FIG. 4.

The pipe portion 20A can be arranged to extend in a lengthwise direction of the steering shaft 5 (a direction indicated by an arrow D of FIG. 9, hereinafter referred to as a pipe extending direction), and can have a tubular shape. As illustrated in FIGS. 6 and 7, the pipe portion 20A can include a front wall portion 20c located in front of the steering shaft 5. The front wall portion 20c can include a substantially circular arc section, and a flat-wall-shaped rear wall portion 20d located behind the steering shaft 5. With these structures, a space S1 through which the steering shaft 5 extends can be formed inside the front wall portion 20c and the rear wall portion 20d (see FIG. 5). The front wall portion 20c and the rear wall portion 20d can be arranged, so as to extend in the pipe extending direction. That is, the front wall portion 20c and the rear wall portion 20d can be provided substantially in parallel to the pipe extending direction.

The bearing retaining portion 22a can have a shape corresponding to that of a lower edge of the pipe portion 20A. The down frame portion 22 can be formed separately from the head pipe 20, and the bearing retaining portion 22a can be connected or fastened, e.g., welded, to the lower edge of the pipe portion 20A. Similarly, the bearing retaining portion 23a can have a shape corresponding to that of an upper edge of the pipe portion 20A. The bearing retaining member 23 can also be formed separately from the head pipe 20, and the bearing retaining portion 23a can be connected or fastened, e.g., welded, to the upper edge of the pipe portion 20A.

As illustrated in FIGS. 8 and 9, the bearing retaining portion 22a can have an annular protrusion 22c formed on an upper edge thereof and fitted to the inside of the pipe portion 20A. Further, the pipe portion 20A can have a protrusion 20e formed on an inner peripheral surface thereof, and extending in the pipe extending direction. A lower end of the protrusion 20e can be formed, e.g., cut, so that the protrusion 22c of the bearing retaining portion 22a is fitted with the lower end of the protrusion 20e (see FIG. 8). Similarly, the bearing retaining portion 23a can have an annular protrusion 23c formed on a lower edge thereof, which is fitted to the inside of the pipe portion 20A. An upper end of the protrusion 20e of the pipe portion 20A can also be formed, e.g., cut, so that the protrusion 23c of the bearing retaining portion 23a is fitted into the cut portion at the upper end of the protrusion 20e (see FIG. 8).

As illustrated in FIG. 9, the side wall portions 20a can be formed to protrude rearward from an upper portion of the pipe portion 20A. As illustrated in FIGS. 5 and 6, the right and left side wall portions 20a can be arranged to face each other, and the front ends of the right and left front pipe portions 21A can be located between the right and left side wall portions 20a. Further, the right side wall portion 20a can be connected or fastened, e.g., welded, to a side surface 21f (e.g., a right side-surface) of the right front pipe portion 21A, and the left side wall portion 20a can be connected or fastened, e.g., welded, to a side surface 21f (e.g., a left side-surface) of the left front pipe portion 21A. Specifically, rear edges 20g of the side wall portions 20a can be formed to be in contact with the side surfaces 21f of the front pipe portions 21A, and can be connected or fastened, e.g., welded, to the side surfaces 21f.

In embodiments, the front pipe portions 21A can be tubular members, each having an approximately or substantially elliptical cross section (e.g., in a view taken in a plane perpendicular to a direction in which a front pipe portion 21A extends), so that a side surface 21f of a front pipe portion 21A is curved. A rear edge 20g of a side wall portion 20a can be formed to extend along a side surface 21f of a front pipe portion 21A, curved to conform with the side surface 21f (see FIG. 4), and be connected or fastened, e.g., welded, to the side surface 21f.

As illustrated in FIG. 5, the lower wall portions 20b can be formed to extend rearward from the lower portion of the pipe portion 20A. The lower wall portions 20b can be located in substantially or approximately a same plane as the side wall portions 20a, and together with the side wall portions 20a, at least partly constitute the (e.g., substantially or approximately flat, plate-shaped) wall portions 20B. The lower wall portions 20b can be located below the front pipe portions 21A and extend rearward beyond the rear edges 20g of the side wall portions 20a. The front pipe portions 21A can extend diagonally rearward and outward in a body width direction of the motorcycle 1 over upper edges or surfaces 20h of the lower wall portions 20b. That is, the right and left front pipe portions 21A can be disposed on the right and left lower wall portions 20b, respectively. The upper edges 20h of the lower wall portions 20b can be located along lower edges of the front pipe portions 21A and connected or fastened, e.g., welded, to respective lower edges of the front pipe portions 21A. See, e.g., FIG. 4.

As described previously (see FIG. 3), the right and left edges 23d of the rear welded portion 23b formed in the bearing retaining member 23 can be located on respective front portions of the front pipe portions 21A, and be connected or fastened, e.g., welded, to outer surfaces of the front pipe portions 21A. Further, the rear edges 20g of the side wall portions 20a can be connected or fastened, e.g., welded, to the side surfaces 21f of the front pipe portions 21A. In addition, the upper edges 20h of the lower wall portions 20b can be connected or fastened, e.g., welded, to the lower edges of the front pipe portions 21A. With this structure, each portion of the head pipe 20 and the bearing retaining member 23, which are connected or fastened, e.g., welded, to the front pipe portions 21A, (that is, the edges 23d of the rear welded portion 23b, the rear edges 20g of the side wall portions 20a, and the upper edges 20h of the lower wall portions 20b) can surround outer surfaces of the front portions of the front pipe portions 21A from above, below, and outside in a body width direction.

Figure 4:
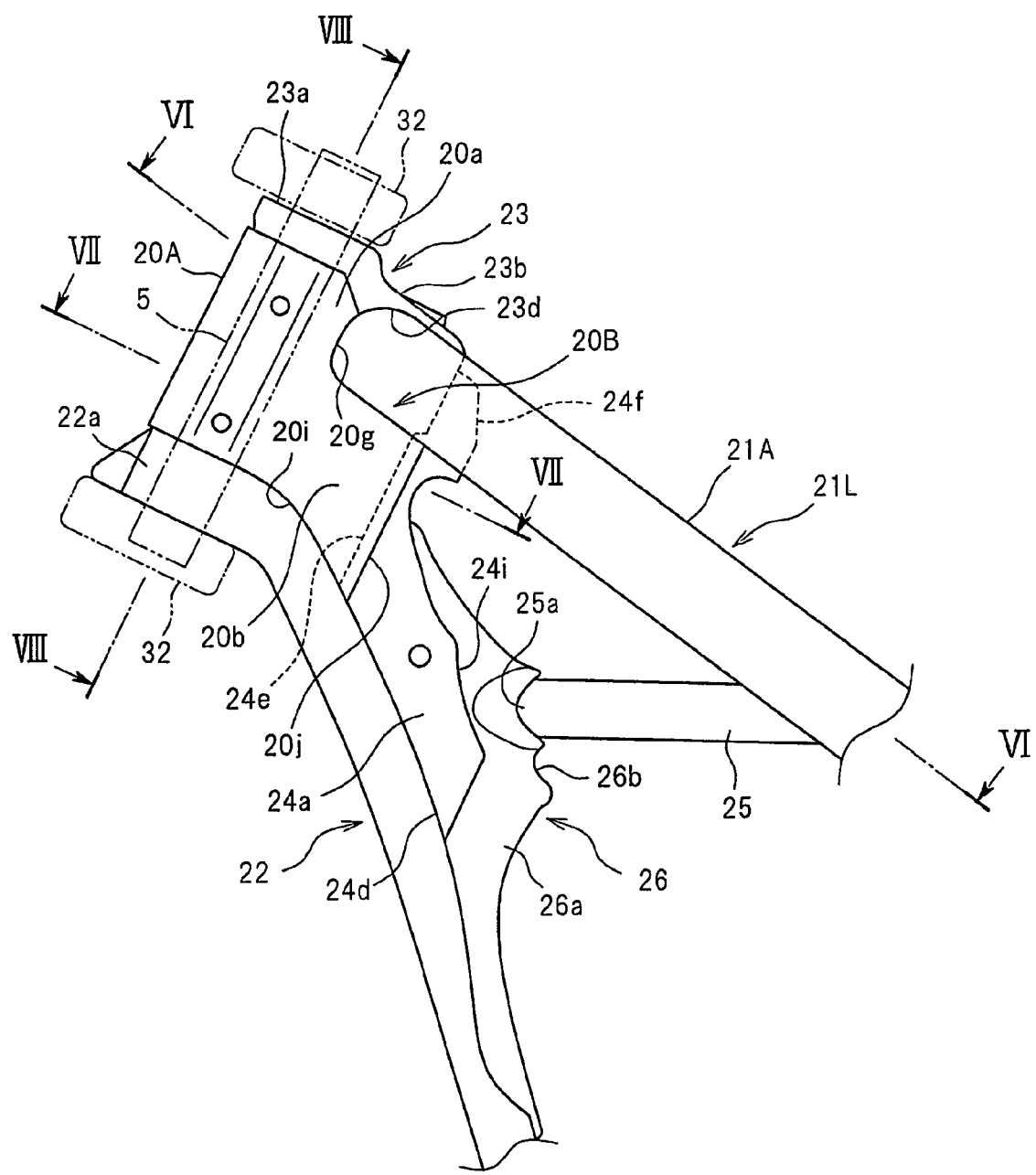
FIG. 4 is a side view of the front portion of the body frame.

As illustrated in FIGS. 3 and 4, the lower wall portions 20b can be connected or fastened to, or formed on, the down frame portion 22. More specifically, lower edges 20i of the lower wall portions 20b can extend diagonally rearward and downward along the down frame portion 22 and be connected or fastened, e.g., welded, to the down frame portion 22. An interval or space between the right and left lower wall portions 20b can correspond to a width of the down frame portion 22, and hence the lower edges 20i of the lower wall portions 20b can be connected or fastened, e.g., welded, to right and left edges of the down frame portion 22, respectively. As illustrated in FIG. 3, the down frame portion 22 can have right and left protrusions 22d formed thereon, and located inside the right and left lower wall portions 20b when fastened thereto. The protrusions 22d can be formed to extend along respective ones of the lower wall portions 20b when fastened thereto. With this structure, positional accuracy of the lower wall portions 20b with respect to the down frame portion 22 can be improved.

The side wall portions 20a and the lower wall portions 20b can be formed to extend substantially along the pipe extending direction. More specifically, the right and left wall portions 20B at least partly constituted by the side wall portions 20a and the lower wall portions 20b can be substantially parallel to the pipe extending direction. A space S2 (see FIG. 5), opening rearward, and upward and downward in the pipe extending direction, can be formed between the right and left wall portions 20B. Front end portions of the front pipe portions 21A can be arranged in the space S2.

The pipe portion 20A and the wall portions 20B can have an outer surface defined by movement of a generatrix line extending along the pipe extending direction. More specifically, the pipe portion 20A and the wall portions 20B can be formed integrally by extruding performed in the pipe extending direction. Therefore, the outer surface of the pipe portion 20A and wall portions 20B can be viewed as including surfaces, e.g., curved or flat surfaces, or both curved and flat surfaces, defined by movement of a straight line parallel to a direction in which the pipe portion 20A extends (for example, straight line 1.1 illustrated in FIG. 9), along a sectional shape (e.g., a shape as seen in a cross-sectional view) of the pipe portion 20A and the wall portions 20B (see, e.g., FIG. 7) while keeping parallel to the direction in which the pipe portion 20A extends.

In manufacturing of the pipe portion 20A and the wall portions 20B, a die having a through hole formed therein can be prepared, the through hole having a shape corresponding to the sectional shape of the pipe portion 20A and the wall portions 20B (the sectional shape of the pipe portion 20A and the wall portions 20B taken, e.g., along a plane perpendicular to the pipe extending direction). A material for the pipe portion 20A and the wall portions 20B (for example, aluminum) can be extruded through the through hole of the die, to form extruded material. Finishing work, such as cutting work or the like can then be performed on the extruded material to form the pipe portion 20A and the wall portions 20B.

Figure 11:
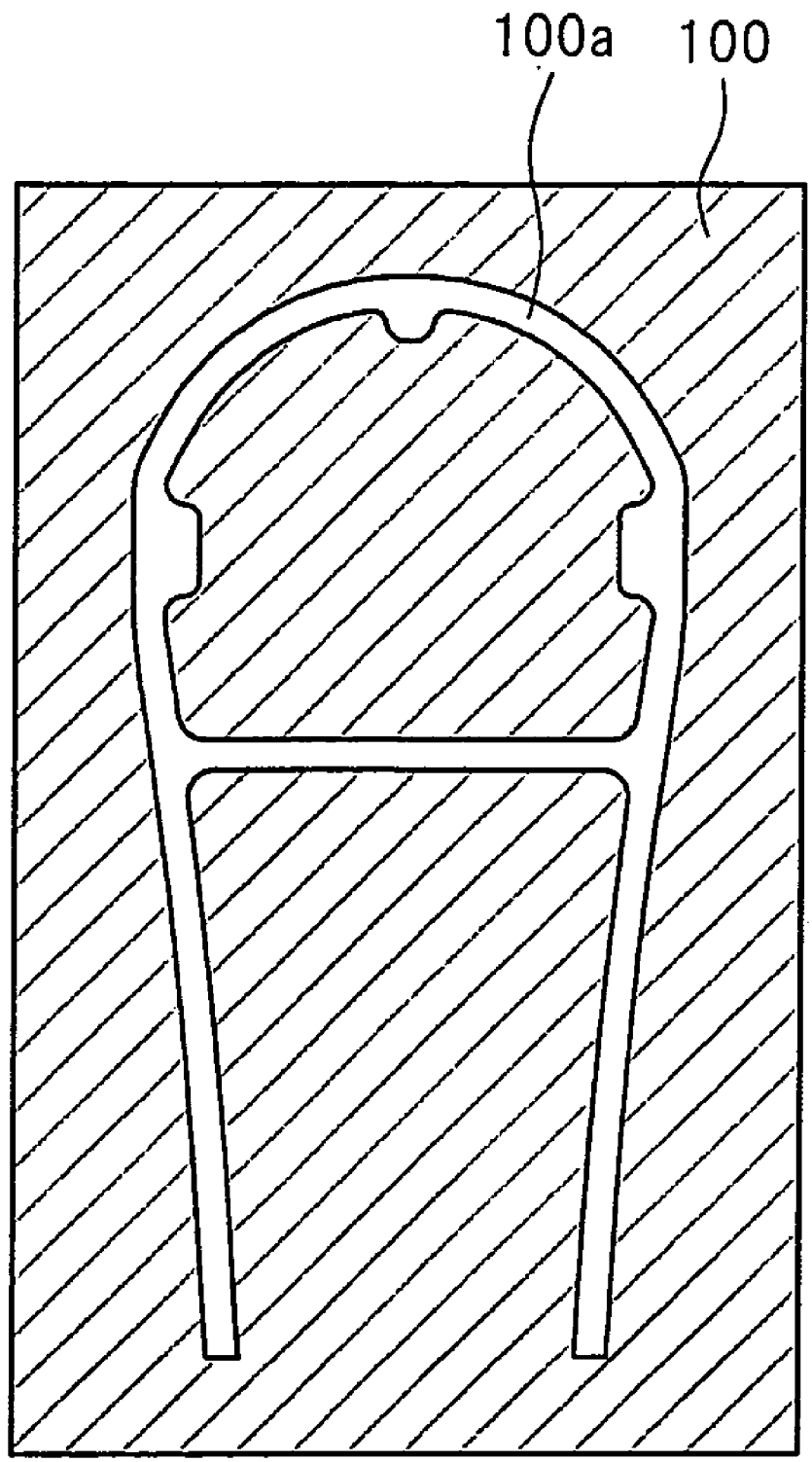
FIG. 11 is a schematic view illustrating an example of a die to be used in manufacturing of the head pipe.

FIG. 11 is a sectional view schematically illustrating a die that can be used in an extrusion process. A hole 100a formed in a die 100 illustrated in FIG. 11 has the same shape as the sectional shape of the pipe portion 20A and the wall portions 20B illustrated in FIG. 7. The head pipe 20 having the pipe portion 20A and the wall portions 20B can be formed by a process of extrusion, comprising forming an extruded material by passing a material through the hole 100a of the die 100. In this regard, in a process of manufacturing the head pipe 20, an extruded material including redundant portions 91 and 92 as illustrated in FIG. 9 may be obtained by passing the material through the hole 100a of the die 100. The redundant portions 91 may be located above the wall portions 20B, and be plate-shaped portions having the same sectional shapes (e.g., shapes as seen in a cross-sectional view) as those of the lower wall portions 20b. Further, the redundant portions 92 can be located below the pipe portions 20A, and have the same sectional shape as that of the pipe portion 20A. In manufacturing of the head pipe 20, after performing extruding as described previously, finishing work such as cutting work can be performed to remove the redundant portions 91 and 92 and upper ends and lower ends of the protrusions 20e formed on the inner peripheral surface of the pipe portion 20A from the extruded material. In this way, the head pipe 20 having the pipe portion 20A and the wall portions 20B can be obtained.

As illustrated in FIG. 3, the body frame 2 can include a reinforcing member 24, a reinforcing stay 25, and a stay support member 26, each of which can be separately formed from the head pipe 20. The reinforcing member 24 can have a rectangular frame shape in a plane view, so that the reinforcing member 24 has right and left side wall portions 24a, a front wall portion 24b, and a rear wall portion 24c (see FIGS. 4 and 5). In other words, a hole 24k passing through the reinforcing member 24 in the pipe extending direction can be formed in the reinforcing member 24. The hole 24k can be surrounded by the side wall portions 24a, the front wall portion 24b, and the rear wall portion 24c.

As illustrated in FIGS. 3 and 4, the reinforcing member 24 can be disposed on the down frame portion 22. Lower edges 24d of the side wall portions 24a can be formed to extend diagonally rearward and downward along the down frame portion 22. An interval or space between the right and left side wall portions 24a can correspond to a width of the down frame portion 22, so that the lower edges 24d of the side wall portions 24a can be connected or fastened, e.g., welded, to respective edges of the down frame portion 22. As illustrated in FIG. 3, the down frame portion 22 can include right and left protrusions 22e formed thereon, which can be located inside the right and left side wall portions 24a when fastened thereto. The respective protrusions 22e can be formed to extend along the side wall portions 24a when fastened thereto. With this structure, positional accuracy of the side wall portions 24a with respect to the down frame portion 22 can be improved.

As illustrated in FIGS. 5 and 7, the reinforcing member 24 can be disposed rearward of the head pipe 20 and connected or fastened, e.g., welded, to the head pipe 20. More specifically, the reinforcing member 24 can be arranged rearward of the lower wall portions 20b, and be in contact with rear edges 20j of the lower wall portions 20b. A front surface of the reinforcing member 24 can be in contact with the rear edges 20j of the lower wall portions 20b. The reinforcing member 24 can include the right and left side wall portions 24a as described previously. An interval or space between the side wall portions 24a can be substantially equal to an interval or space between the lower wall portions 20b. The side wall portions 24a can be located rearward of respective lower wall portions 20b, and the rear edges 20j of the lower wall portions 20b and front edges 24j of the side wall portions 24a can be in contact with each other, and connected or fastened, e.g., welded, together. In this regard, the front wall portion 24b bridging the front edges 24j of the right and left side wall portions 24a can have right and left protrusions 24e formed thereon, which are fitted inside the right and left lower wall portions 20b. The protrusions 24e can be formed to extend in a substantially up-and-down direction along respective ones of the lower wall portions 20b. With this structure, positional accuracy the head pipe 20 with respect to the reinforcing member 24 can be improved.

The reinforcing member 24 can be arranged between the right and left front pipe portions 21A of the main frame portions 21R and 21L, and be connected or fastened, e.g., welded, to respective ones of the front pipe portions 21A. In embodiments, the side wall portions 24a can have a substantially V-shape in a side view. As illustrated in FIGS. 3 and 6, an upper portion of the reinforcing member 24 can be sandwiched by the right and left main frame portions 21R and 21L, defining an interval or space between the right and left main frame portions 21R and 21L. The right and left side wall portions 24a can respectively include, in front portions thereof, right and left side-wall upper portions 24f extending substantially upward and located between the right and left front pipe portions 21A when fastened thereto. The right and left side-wall upper portions 24f can be located along inner surfaces of the right and left front pipe portions 21A (e.g., side surfaces opposite to the side surfaces 21f and facing toward the center in the body width direction of the motorcycle 1) and be connected or fastened, e.g., welded, to respective ones of the inner side surfaces. For example, rear edges 24g of the side-wall upper portions 24f can be connected or fastened, e.g., welded, to side surfaces of the front pipe portions 21A (see FIG. 10). As described previously, the front pipe portions 21A can be arranged to extend diagonally rearward and outward in the body width direction of the motorcycle 1. Therefore, the side-wall upper portions 24f can also extend diagonally along the side surfaces of the front pipe portions 21A when fastened thereto (see FIG. 5). More specifically, the side-wall upper portions 24f can be formed diagonally such that the rear edges 24g are located further outward in the body width direction than front edges of the side-wall upper portions 24f.

Figure 10:
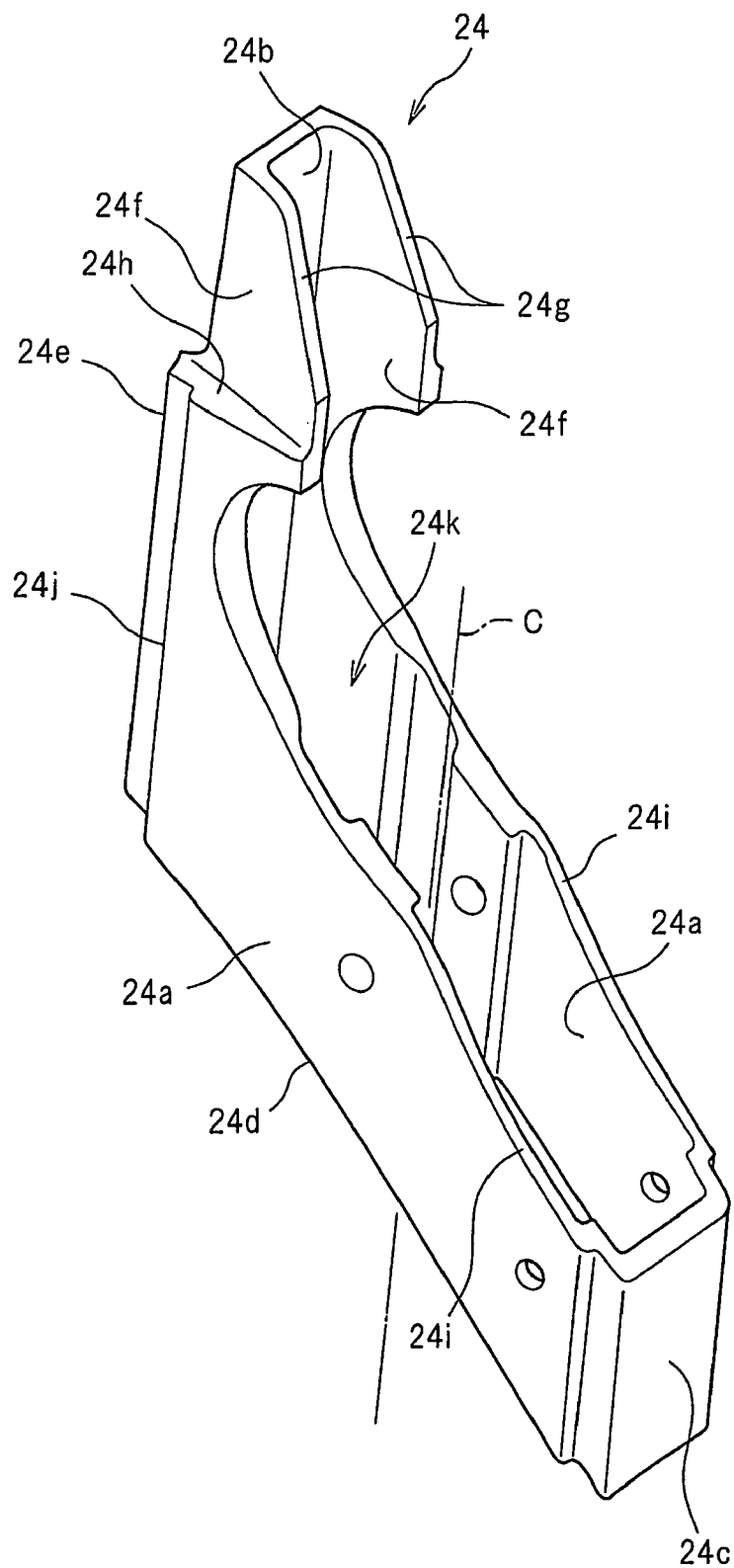
FIG. 10 is a perspective view of the reinforcing member.

Further, the reinforcing member 24 can be formed so as to support the front pipe portions 21A and 21A from below. As illustrated in FIGS. 5 and 10, the side wall portions 24a can each include, on side surfaces thereof, rest portions 24h projecting out laterally. The front pipe portions 21A can be disposed on the rest portions 24h, so that the reinforcing member 24 supports the front pipe portions 21A from below. Further, lower edges of the front pipe portions 21A and the rest portions 24h can be connected or fasted, e.g., welded, to each other. In this regard, the rest portions 24h can be formed to be substantially flush with the upper edges or surfaces 20h of the lower wall portions 20b formed in the head pipe 20.

The side wall portions 24a, the front wall portion 24b, and the rear wall portion 24c can be arranged along the pipe extending direction of the pipe portion 20A defined previously. That is, each of the wall portions of the reinforcing member 24 can be substantially or approximately parallel to the pipe extending direction. In particular, similarly to the head pipe 20, the reinforcing member 24 can have an outer surface defined by movement of a generatrix line extending along the pipe extending direction. That is, the outer surface of the reinforcing member 24 can be viewed as including surfaces, e.g., curved or flat surfaces, or both curved and flat surfaces, defined by movement of a straight line parallel to a direction in which the pipe portion 20A extends, along a sectional shape of the reinforcing member 24 while keeping parallel to the direction in which the pipe portion 20A extends.

The reinforcing member 24 can be formed integrally (e.g., as a single unitary part or member) by extruding performed in the pipe extending direction. More specifically, in manufacturing of the reinforcing member 24, a die having a through hole formed therein can be prepared, the through hole having a shape corresponding to the sectional shape of the reinforcing member 24 (e.g., a sectional shape of the reinforcing member 24 taken along a plane perpendicular to the pipe extending direction). A material for the reinforcing member 24 (for example, aluminum) can be extruded through the through hole of the die to form an extruded material. Finishing work such as cutting work or the like can be performed on the extruded material to form the reinforcing member 24.

The reinforcing member 24 can be arranged such that an extruding direction of the reinforcing member 24 is substantially parallel to the pipe extending direction. Therefore, as described previously, the outer surface of the reinforcing member 24 can be defined by the movement of the generatrix line extending along the pipe extending direction. As a result, the front edges 24j of the reinforcing member 24 can extend in the pipe extending direction. In addition, the head pipe 20 can be formed by extruding performed in the pipe extending direction, so that the rear edges 20j of the lower wall portions 20b also extend in the pipe extending direction. Accordingly, the front edges 24j of the reinforcing member 24 and the rear edges 20j of the lower wall portions 20b can be in close contact with each other. With this structure, welding strength between the head pipe 20 and the reinforcing member 24 can be enhanced. Further, a center line C (see FIG. 10) in the hole 24k formed in the reinforcing member 24 (wherein line C is, e.g., a straight line which substantially parallel to inner surfaces of the reinforcing member 24 and runs through the center of the hole 24k that extends in a front-to-rear direction and a right-to-left direction) can be substantially parallel to the pipe extending direction. In this regard, as described previously, the rest portions 24h on which the front pipe portions 21A can be placed can be formed on respective side surfaces of the side wall portions 24a. The rest portions 24h can be formed by partially cutting outer surfaces of the extruded material having extruded through the hole of the die, that is, side surfaces of the side wall portions 24a.

As illustrated in FIG. 3, the stay support member 26 can be fixed to the reinforcing member 24 from above. Specifically, the stay support member 26 can include an upper wall portion 26b arranged to face the down frame portion 22 in a substantially up-and-down direction. Further, the stay support member 26 can include right and left side wall portions 26a extending downward from right and left edges of the upper wall portion 26b and located inside the right and left side wall portions 24a. Upper edges 24i of the side wall portions 24a can be connected or fastened, e.g., welded, to respective side surfaces of the side wall portions 26a (see FIG. 10).

The stay support member 26 can support the reinforcing stay 25 on the upper wall portion 26b. More specifically, the reinforcing stay 25 can be a substantially U-shaped member, and a top (e.g., a portion corresponding to the curved part of a U-shape) 25a of the reinforcing stay 25 can be connected or fastened, e.g., welded, onto the upper wall portion 26b. The reinforcing stay 25 can be arranged to extend from the top 25a toward the right and left front pipe portions 21A, and end portions of the reinforcing stay 25 can be connected or fastened, e.g., welded, to lower edges of the front pipe portions 21A. In this way, the reinforcing stay 25 can support the front pipe portions 21A from below.

As described previously, the body frame 2 of the motorcycle 1 can include the head pipe 20 including: the pipe portion 20A inside which the steering shaft 5 is disposed or inserted; and the lower wall portions 20b formed behind the pipe portion 20A. The lower wall portions 20b and the pipe portion 20A are can be integrally formed (e.g. as a single unitary part) by extruding performed in the extending direction of the pipe portion 20A. Further, the motorcycle 1 can include: the right and left main frame portions 21R and 21L arranged to extend rearward from the pipe portion 20A and disposed on the lower wall portions 20b; and the reinforcing member 24 disposed rearward of the lower wall portions 20b and in contact with the rear edges 20j of the lower wall portions 20b. The reinforcing member 24 can be arranged such that an upper portion (e.g., side-wall upper portions 24f in the foregoing description) of the reinforcing member 24 is sandwiched by the right and left main frame portions 21R and 21L. Further, the rest portions 24h, on which the right and left main frame portions 21R and 21L can be disposed, can be respectively formed on the right side surface and the left side surface of the reinforcing member 24.

In the motorcycle 1 as described in the foregoing, because the head pipe 20 can be formed by extruding, it is possible to increase strength of the head pipe 20, and to reduce the number of steps of manufacturing the head pipe 20. Further, because the lower wall portions 20b of the head pipe 20 on which the main, frame portions 21R and 21L are disposed can be integrally formed with the pipe portion 20A, it is possible to improve relative positional accuracy between the main frame portions 21R and 21L and the head pipe 20. In addition, because the reinforcing member 24 can be arranged to be in contact with the rear edges 20j of the lower wall portions 20b, it is possible to prevent the reinforcing member 24 from being relatively displaced with respect to the head pipe 20. Moreover, because the main frame portions 21R and 21L can be disposed on the rest portions 24h formed on the side surfaces of the reinforcing member 24, it is possible to prevent the right and left main frame portions 21R and 21L from being relatively displaced with respect to the reinforcing member 24.

Further, in the motorcycle 1, as described previously the lower wall portions 20b can include the upper surfaces 20h, on which the right and left main frame portions 21R and 21L can be disposed, formed substantially flush with the rest portions 24h. With this structure, it is possible to continuously perform fastening, e.g., welding, of the upper surfaces 20h of the lower wall portions 20b to the main frame portions 21R and 21L and fastening, e.g., welding, of the rest portions 24h to the main frame portions 21R and 21L, and hence workability of a fastening process such as welding can be improved.

Further, in the motorcycle 1, the reinforcing member 24 can have a front surface (referred to as front edges 24j of the side wall portions 24a in the foregoing description) arranged to be in contact with the rear edges 20j of the lower wall portions 20b. With this structure, it is possible to reliably fasten, e.g., weld, the reinforcing member 24 to the rear edges 20j of the lower wall portions 20b.

Further, in the motorcycle 1, the reinforcing member 24 can be formed by a process of extrusion, as described previously. Further, the reinforcing member 24 can be arranged such that a direction in which the reinforcing member 24 is extruded is substantially parallel to a direction in which the pipe portion 20A extends. With this structure, a shape of the front surface of the reinforcing member 24 can be reliably conformed to the rear edges 20j of the lower wall portions 20b.

As further described in the foregoing, in the motorcycle 1, the reinforcing member 24 can have the hole 24k formed therein and passing through the reinforcing member 24 such that the center line C in the hole 24k is substantially parallel to the direction in which the pipe portion 20A extends. With this structure, it is possible to reduce a weight of the reinforcing member 24.

Further, in the motorcycle 1 as described in the foregoing, the head pipe 20A can include right and left lower wall portions 20b each defining the lower wall portion 20b and spaced apart from each other in a right-to-left direction. The right and left main frame portions 21R and 21L can be disposed on the right and left lower wall portions 20b, respectively. With this structure, when compared to a structure in which the right and left main frame portions 21R and 21L both are supported by one thick lower wall portion, it is possible to reduce a weight of the head pipe 20.

Further, in the motorcycle 1 as described previously, the head pipe 20 can further include the right and left side wall portions 20a which are formed rearward of the pipe portion 20A and located above the lower wall portions 20b. The rear edges 20g of the right and left side wall portions 20a can be arranged to be in contact with side surfaces of the right and left main frame portions, respectively. With this structure, it is possible to connect or fasten, e.g., weld, the rear edges 20g of the side wall portions 20a to the side surfaces of the main frame portions 21R and 21L: As a result, it is possible to increase strength in connection between the head pipe 20 and the main frame portions 21R and 21L.

Further, in the motorcycle 1, the pipe portion, 20A, the lower wall portions 20b, and the right and left side wall portions 20a can be integrally formed by the extruding performed in the direction in which the pipe portion 20A extends. With this structure, it is possible to increase strength of the head pipe 20.

In the motorcycle 1, the bearing retaining portions 22a and 23a for retaining the bearings 51 and 52 can be respectively provided to the down frame portion 22 and the bearing retaining member 23, which can be formed separately from the head pipe 20. However, portions retaining the bearings 51 and 52 may be integrally formed with the head pipe 20. For example, a pipe portion inside which the steering shaft 5 is inserted may be formed by extruding performed in the pipe extending direction. After that, by cutting an inner peripheral surface at the end portion of the pipe portion, portions for retaining the bearings 51 and 52 may be formed in the inner peripheral surface.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A motorcycle, comprising:
   a head pipe including a pipe portion inside which a steering shaft is inserted, and left and right wall portions formed behind the pipe portion, the left and right wall portions and the pipe portion being integrally formed by extruding metal in a direction in which the pipe portion extends;
   a right main frame and a left main frame arranged to extend rearward from the pipe portion, the right main frame having a forward portion that is disposed on an upper edge of the right wall portion and the left main frame having a forward portion that is disposed on an upper edge of the left wall portion; and a reinforcing member disposed behind the left and right wall portions and in contact with rear edges of the left and right wall portions, wherein the reinforcing member is arranged such that an upper portion of the reinforcing member is sandwiched by the right main frame and the left main frame, and the reinforcing member has rest portions formed on a right side surface and a left side surface thereof, the right main frame and the left main frame being respectively disposed on the rest portions.

2. The motorcycle according to claim 1, wherein the upper edges of the left and right wall portions are substantially flush with the rest portions.

3. The motorcycle according to claim 1, wherein the reinforcing member has a front surface arranged to be in contact with the rear edges of the left and right wall portions.

4. The motorcycle according to claim 3, wherein the reinforcing member is formed by extruding, and the reinforcing member is arranged such that a direction in which the reinforcing member is extruded is substantially parallel to the direction in which the pipe portion extends.

5. The motorcycle according to claim 4, wherein the reinforcing member has a hole formed therein and passing through the reinforcing member such that a center line of the hole is substantially parallel to the direction in which the pipe portion extends.

6. The motorcycle according to claim 1, wherein a rear edge region of the right wall portion and a rear edge region of the left wall portion are arranged to be in contact with a side surface of the right main frame and a side surface of the left main frame, respectively.

7. A vehicle body frame, comprising:

a head pipe including a pipe portion configured to receive a steering shaft, and left and right wall portions formed behind the pipe portion, the left and right wall portion being integrally formed by extruding metal in a direction in which the pipe portion extends;

a right main frame and a left main frame arranged to extend rearward from the pipe portion, the right main frame having a forward portion that is disposed on an upper edge of the right wall portion and the left main frame having a forward portion that is disposed on an upper edge the left wall portion; and a reinforcing member disposed behind the left and right wall portions and in contact with rear edges of the left and right wall portions, wherein the reinforcing member is arranged such that an upper portion of the reinforcing member is sandwiched by the right main frame and the left main frame, and the reinforcing member has rest portions formed on a right side surface and a left side surface thereof, the right main frame and the left main frame being respectively disposed on the rest portions.

* * * * *